(12) United States Patent
Afanasyev et al.

(10) Patent No.: US 9,807,346 B2
(45) Date of Patent: Oct. 31, 2017

(54) REAL-TIME INSECT MONITORING DEVICE

(75) Inventors: Mikhail Afanasyev, Campbell (AU);
Nancy Schellhorn, Campbell (AU);
Luke Hovington, Campbell (AU);
Anna Marcora, Campbell (AU);
Darren Craig Moore, Campbell (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 703 days.

(21) Appl. No.: 13/881,122

(22) PCT Filed: Oct. 31, 2011

(86) PCT No.: PCT/AU2011/001396
§ 371 (c)(1),
(2), (4) Date: Jul. 15, 2013

(87) PCT Pub. No.: WO2012/054990
PCT Pub. Date: May 3, 2012

(65) Prior Publication Data
US 2013/0293710 A1 Nov. 7, 2013

(30) Foreign Application Priority Data

Oct. 29, 2010 (AU) ................................. 2010904838

(51) Int. Cl.
*H04N 7/18* (2006.01)
*A01M 1/02* (2006.01)
*A01M 1/10* (2006.01)

(52) U.S. Cl.
CPC .............. *H04N 7/18* (2013.01); *A01M 1/026* (2013.01); *A01M 1/106* (2013.01)

(58) Field of Classification Search
CPC .............................. A01M 1/026; A01M 1/106
See application file for complete search history.

(56) References Cited

U.S. PATENT DOCUMENTS 5,497,576 A    3/1996  Nowak
6,112,452 A *  9/2000  Campbell ............... A01M 1/02
                                                    215/319

(Continued)

FOREIGN PATENT DOCUMENTS

WO  WO 2010/083053 A1   7/2010
WO  WO 2010/103266 A1   9/2010

OTHER PUBLICATIONS

International Search Report, mailed Feb. 21, 2012 in connection with PCT International Application No. PCT/AU2011/001396, filed Oct. 31, 2011.

(Continued)

*Primary Examiner* — Md Haque
(74) *Attorney, Agent, or Firm* — John P. White; Cooper and Dunham LLP

(57) ABSTRACT

This invention concerns the in-situ monitoring of insects, and in particular an insect inspection cylinder and trap to facilitate this monitoring. The trap comprises means to intercept flying insects and direct them to an inspection cylinder that is connected to an outlet from the means to intercept flying insects. An insect detector is associated with the cylinder to detect insects inside it, and a camera is associated with the cylinder and the detector to capture images of insects inside the cylinder. Wherein the sectional dimensions of the inspection cylinder are sized to prevent insects selected for observation from flying through it, but instead requiring them to walk through it.

18 Claims, 4 Drawing Sheets

(56) References Cited

U.S. PATENT DOCUMENTS

| | | | |
|---|---|---|---|
| 6,678,995 B1* | 1/2004 | Carviel | A01M 1/2016 43/107 |
| 6,789,351 B2 | 9/2004 | Chrestman | |
| 6,853,328 B1 | 2/2005 | Guice et al. | |
| 7,020,996 B2 | 4/2006 | Beroza et al. | |
| 2005/0025357 A1* | 2/2005 | Landwehr | A01M 1/026 382/170 |
| 2008/0263938 A1* | 10/2008 | Schneidmiller | A01M 1/106 43/122 |

OTHER PUBLICATIONS

Written Opinion of the International Searching Authority, mailed Feb. 21, 2012 in connection with PCT International Application No. PCT/AU2011/001396, filed Oct. 31, 2011.

International Preliminary Report on Patentability, issued Apr. 30, 2013 in connection with PCT International Application No. PCT/AU2011/001396, filed Oct. 31, 2011.

* cited by examiner

REAL-TIME INSECT MONITORING DEVICE

CROSS-REFERENCE TO RELATED APPLICATIONS

This application is a §371 national stage of PCT International Application No. PCT/AU2011/001396, filed Oct. 31, 2011, claiming priority of Australian Patent Application No. 2010904838, filed Oct. 29, 2010, the contents of each of which are hereby incorporated by reference in its entirety.

TECHNICAL FIELD

This invention concerns the in-situ monitoring of insects, and in particular an insect inspection cylinder and trap to facilitate monitoring.

BACKGROUND ART

The Malaise insect trap is used to collect flying insects for classification and study. This kind of trap uses a large screen tent to intercept flying insects, and then directs them to a closed collection cylinder. Scientists empty the cylinder periodically, usually weekly, and record the dead insects that have been captured.

DISCLOSURE OF THE INVENTION

The invention is an open-ended insect inspection cylinder that, in use, is connected to an outlet from a means to intercept flying insects. An insect detector is associated with the inspection cylinder to detect insects inside it, and a camera is associated with the cylinder and the detector to capture images of insects inside the cylinder. The sectional dimensions of the inspection cylinder are sized to prevent insects selected for observation from flying through it, but instead requires them to walk through it.

In one example the cylinder has a rectangular section and the sectional dimensions are the lengths of the sides of that rectangle.

The invention is also an entire insect trap comprising means to intercept flying insects and direct them to the open-ended inspection cylinder that is connected to an outlet from the means to intercept flying insects. Again, an insect detector is associated with the inspection cylinder to detect insects inside it, and a camera is associated with the cylinder and the detector to capture images of insects inside the cylinder. The camera may be a video camera or a single image capture device that captures a sequence of images.

The invention allows automated insect monitoring. It is particularly suitable for assessing both insect behaviour and image quality.

Another advantage of the invention is to enable real-time monitoring and species detection, of insects present at a specific location and time. Current systems collect insects over a period time, which records the species but not the collection times. Alternatively, they count insect numbers over time, recording the collection time, but not the species. The invention facilitates simultaneous recording of collection time and insect type. The time when a specific insect arrives is very useful information for entomologists.

The means to intercept flying insects, or "trapping head", may be a tent of the type used in the Malaise trap. However, any other types of flight interception traps could be used, such as light traps (which might turn on and off an insect-attracting light), and chemical-based traps (e.g. pheromones). Or any combination of such traps.

The inspection cylinder may be rectangular in cross-section and form a channel that is narrow enough to require the selected insects to walk through. The channel width may be adjustable. Alternatively, the presence of a barrier, such as a maze, may be used to prevent the insects from flying through the cylinder, forcing them to walk.

One, or more, of the walls of the inspection cylinder may be transparent to allow a camera to be mounted above it and capture images of the insects. Typically the transparent wall may be above the inspection cylinder so the camera may capture images of the insects from above. Part of the inside of the inspection cylinder may be coated with a non-sticky, for instance Teflon, coating that discourages insects from walking on the wrong wall of the channel. An alternative might be to interrupt the surface of the wrong walls to make it more difficult for the insects to walk on them; for instance by sticking little plastics barriers across them.

Insects may pass over a multicoloured background, such as stripes of known size, which allows good contrast images across a wide range of insect colours, and provides information about insect size.

Once the detector detects an insect, images of the insect are captured and recorded along with the date and time. The arrangement allows the camera to take many high-quality, close-up pictures of insects, which aids identification; without harming the insects. The camera may transfer the images of the insects to a base station for later review, and possibly automated classification.

The camera may be a video camera. A video camera allows much easier counting of insects, and does not require scientists spending hours of their time sorting insects.

The dimensions of the, rectangular, cylinder may be adjustable, so they can be readily changed for inspecting different insects.

Insects within the inspection cylinder may be detected using an infrared detector. Alternatively, or in addition, insects may be detected by searching for motion in the video.

Once the insects have walked through the inspection cylinder they are free to escape back into the environment unharmed. Alternatively, they can be captured for later assessment.

The lack of moving parts means that the trap is more durable and easier to clean and maintain.

BRIEF DESCRIPTION OF THE DRAWINGS

Two examples of the invention will now be described with reference to the accompanying drawing, in which.

BEST MODE OF THE INVENTION

Insect trap 10 comprises a large tent 12 to intercept flying insects and direct them to an inspection cylinder 20 that is connected to the upper outlet 14 of tent 12.

Figure 1:
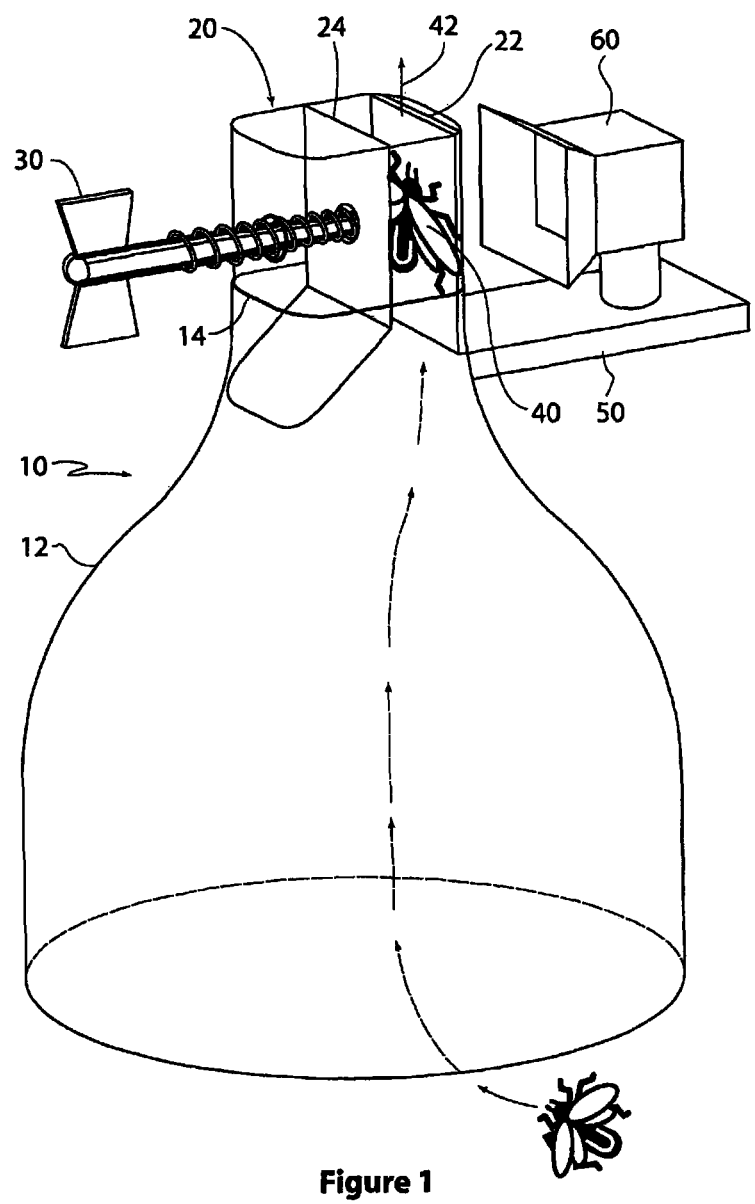
FIG. 1 is a diagram of an insect trap showing interior detail of the inspection cylinder.
Figure 2:
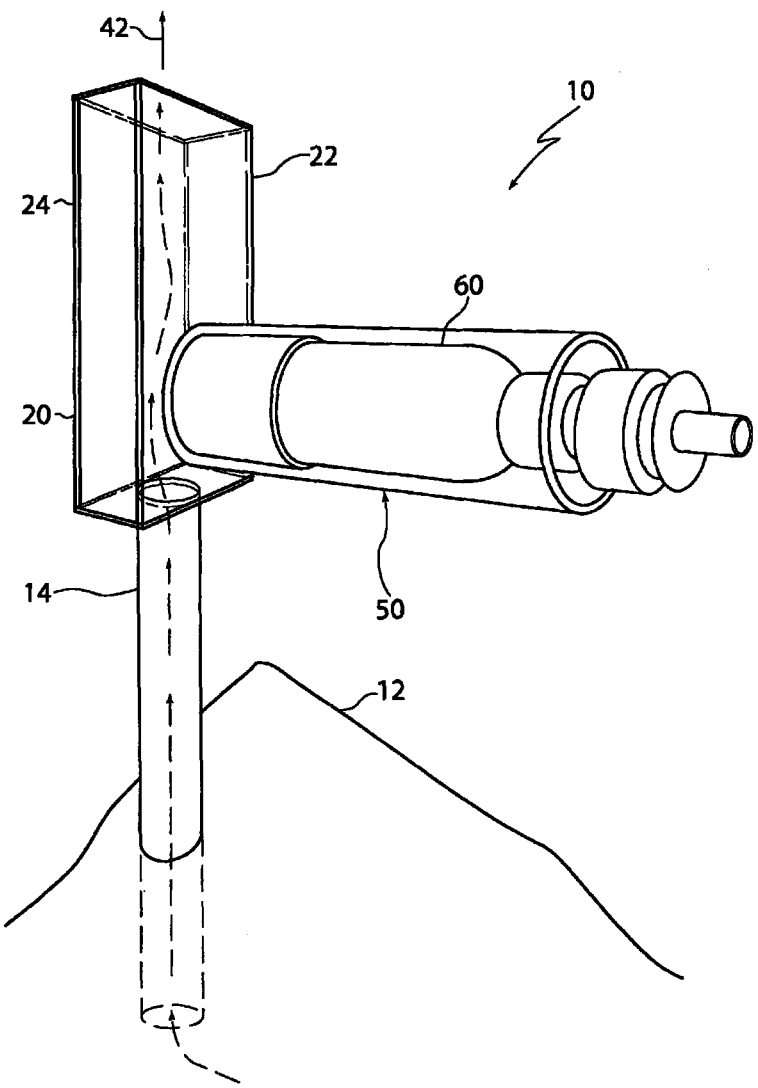
FIG. 2 is a diagram of an alternative arrangement of the trap.
Figure 3:
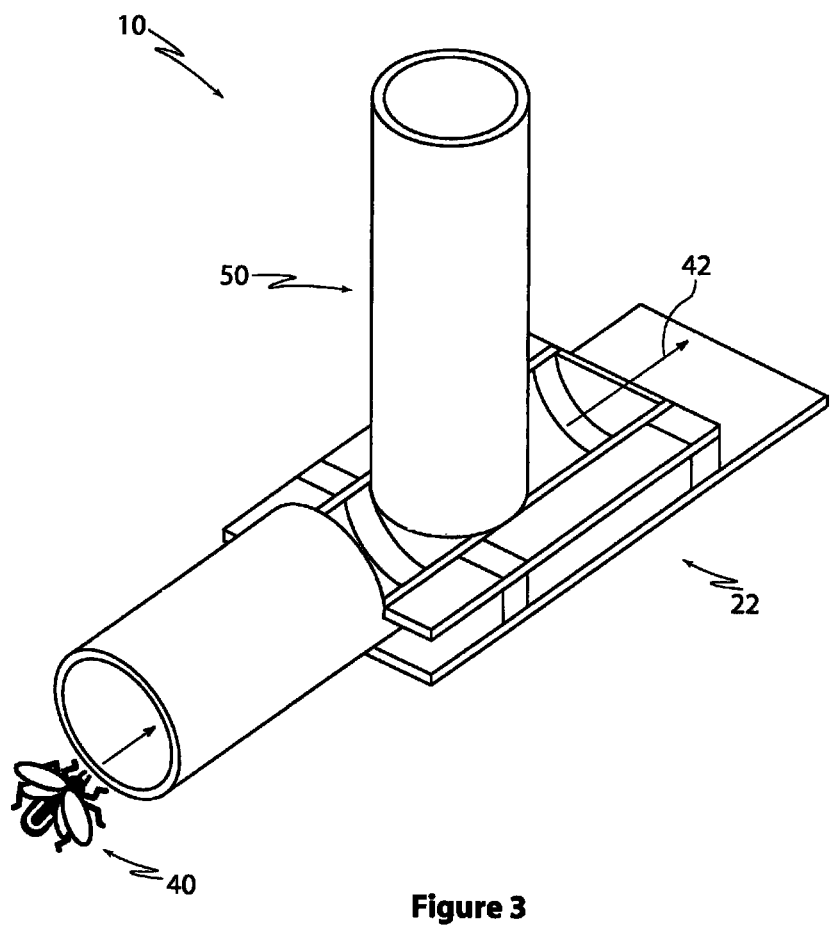
FIG. 3 is a diagram of an alternative arrangement of the trap with a removable maze.
Figure 4:
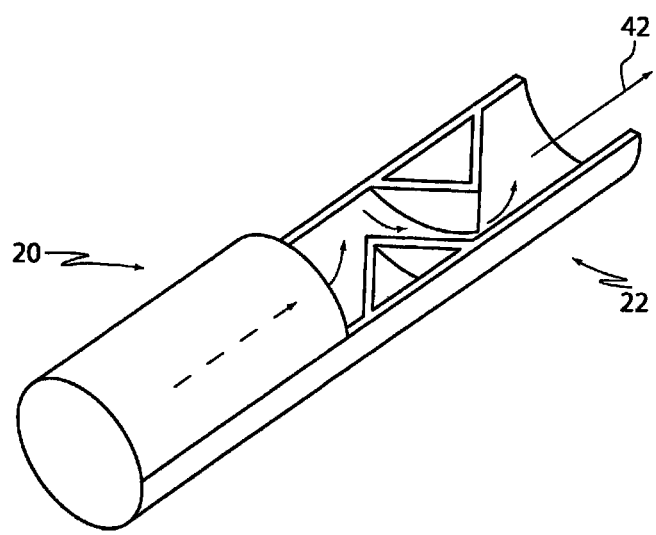
FIG. 4 is a diagram of a maze in the inspection cylinder.

The open-ended inspection cylinder 20 has a plexi-glass wall 22 and, parallel to it, a moveable wall 24 that is able to be advanced toward the glass wall 22; and back away from it. A manually operable threaded mechanism 30 is provided for this purpose (shown only in FIG. 1). Mechanism 30 is adjusted so that insects of current interest only have room to walk between plates 22 and 24. The inside surface of transparent plate 22 is coated with a Teflon film to make it difficult for the insects 40 to climb on it. This results in more insects passing through in the orientation shown. Once they have walked through the cylinder the insects are able to fly away as indicated by arrow 42.

Mounted on a platform 50 outside the glass wall 22 is a camera system 60 that records images of the insects that pass through the cylinder 20. The camera system 60 is left in a quiescent state where it is able to detect changes in the images being captured, and to respond by recording the changing images and marking them with the time and date. The recorded images may be stored on the camera for later download, or transmitted, for instance over a wireless link, to a base station (not shown).

One feature of the invention is that it offers 'real-time' insect monitoring and data collection. To be able to make this claim it was necessary to ensure, once an insect entered the malaise trap, that it was able to then enter, move through and exit the device in a timely manner in order to accurately reflect 'real-time' insect movement in the data. To test this feature, multiple insect releases were made on different days, at different times of the day with varying weather conditions and insect behaviour within the trap and device was observed over time. It was found that within 10 minutes at least 80% of the insects released in the trap had already moved through the device, with the majority of the remaining insects having gone through the system within 15-20 minutes from time of release. Keeping in mind that these traps collect a vast array of insects that move at different speeds; for instance, a fly would move through the trap and device quicker than say a beetle. The results do in fact reflect 'real-time' insect movement in the field.

Another important feature of this invention is its ability to take quality images of an insect as it passes though the cylinder, resulting in the insect being able to be identified to an appropriate taxonomic level from the image. For most insects, having a dorsal or side image is more useful then a ventral image for identification, with a combination of two or more angles being the most useful for a reliable identification from an image. The design of a 'maze' within the cylinder as well as the angle and orientation that the cylinder sits at on the trap, helps to ensure that in most cases the insect moves through the device so that it is positioned for a dorsal or side image to be taken as it passes in front of the camera, and is in focus at some point.

To test accuracy, nine release trials were carried out at different times of the day over a period of three days. The images of the insects taken during these releases were identified, counted and compared with the data collected from the manual sorting of a trap collection for each release. It was found that 80.5% of the time a dorsal and/or side image of the insect was obtained, with a ventral only image obtained 11.6% of the time and a completely blurred unidentifiable image obtained 7.8% of the time. In most cases the level of identification achieved from the image equalled the same level of identification from the actual specimen, and in most cases an accurate identification was also possible with a ventral only image. When comparing the total number of insects, four out of the nine trials resulted in the total number of insects counted from the images equalling the total number of insects counted during the manual sorting of the specimens. With the remaining five trials there was an average difference of only six insects more in the total image count compared to the actual specimen count. The main difference was found between the time taken to sort through the images compared to the time taken to manually sort through the specimens. Out of the nine trials it took approximately three or four times longer to sort through the images compared to manually sorting through the actual insect specimens. Having said that, it has been mentioned on several occasions that the potential and vision for this device in the future is for it to also offer automated image identification through the use of a type of recognition software, thereby making the issue mentioned above, of increased image sorting time, redundant.

INDUSTRIAL APPLICATION

1. The invention is fitted to, or is incorporated with a conventional interception trap.
2. It captures a sequence of high magnification images of insects as they pass through the trap.
3. It encourages insects to pass through the trap at desired orientation for identification.
4. There is no need to collect, kill or handle insects.
5. It detects when insects are in the trap.
6. It records the date and time of insect events, which results in high temporal resolution.
7. It may also record environmental conditions, such as temperature, humidity, light, etc.
8. It captures images of active insects.
9. It is designed to accommodate a range of insect sizes for any single event capture (eg. 3-15 mm).
10. By capturing an image sequence (instead of just one) the chance of acquiring a high quality image (focus, insect pose, etc) is maximised. A high quality image of each insect is a prerequisite for image based classification either manual or automated.
11. Insects are forced to cover a range of object distances, hence guaranteed to be within the depth of field.
12. It uses a range of mechanisms to maximise very high quality images obtained.
13. It transmits a sub-set of insect images to user, for instance by 3G network or by Internet.
14. Potential to automatically monitor the state of the trap, e.g. to alert user when trap entry becomes blocked by a spider web.
15. Potential for real time identification through automated image classification, or near real-time identification by transmitting an image to a human expert.
16. Potential for multiple traps to operate as a grid. The operation of each trap can be synchronised with others in the grid. Potentially there is need for only one trap in the grid to have internet access.
17. Low cost-design based on inexpensive off-the-shelf components.
18. Field ready, water tight.
19. Potential for broad application to a range of insect monitoring issues (biosecurity, agriculture, biodiversity, etc.)
20. Doesn't need to capture/kill insects, but it can if required.
21. Gives insect size.

Although the invention has been described with reference to a particular example it should be appreciated that many variations are possible. For instance, other means for collecting the insects and directing them to the inspection cylinder may be used, besides the Malaise tent. Also, other mechanisms may be used to adjust the dimensions of the inspection cylinder. The dimensions by be adjustable in both cross dimensions, and it does not have to be rectangular in cross-section. An alternative cross-sectional shape might have a flat glass side and a curved back, which would make it more difficult for the insects to camp in the corners. Any suitable imaging system may be used. And, processing following image capture may be performed automatically, either at the camera or remotely. Furthermore, additional lighting, weather proofing and other sensors may allow for operation in poor weather conditions or at night.

The invention claimed is:

1. An insect monitoring device comprising:
   an open-ended insect inspection cylinder for connection at one end, in use, to an outlet from an open-ended insect interception trap, where sectional dimensions of the inspection cylinder are sized to prevent an insect selected for observation from flying through the inspection cylinder, and instead requiring the insect to walk through the inspection cylinder;
   an insect detector associated with the inspection cylinder to detect insects inside the inspection cylinder as the insects walk through the inspection cylinder; and
   a camera system associated with the inspection cylinder and the insect detector, the camera system including a camera to capture images of particular views of insects in desired orientations inside the inspection cylinder detected by the insect detector,
   wherein the inspection cylinder includes an inner surface, and the inner surface is constituted to make it difficult for the insect to walk on a first portion of the inner surface, and the sectional dimensions of the inspection cylinder prevent the insect from flying through the inspection cylinder, and said camera is disposed relative to the inspection cylinder to capture a view of a second portion of the inner surface to capture the images of the particular views of insects in the desired orientations inside the inspection cylinder.

2. An insect monitoring device according to claim 1, wherein the inspection cylinder has a rectangular section and the sectional dimensions are the lengths of the sides of that rectangle.

3. An insect trap comprising:
   an insect monitoring device according to claim 1; and
   an open-ended insect interception trap having an inlet and an outlet, the outlet being configured to connect and direct intercepted flying insects to the inspection cylinder.

4. An insect trap according to claim 3, wherein the open-ended insect interception trap is a tent of the type used in the Malaise trap.

5. An insect trap according to claim 3, wherein the inspection cylinder has a rectangular section and the sectional dimensions are the lengths of the sides of that rectangle.

6. An insect trap according to claim 3, wherein the inspection cylinder has a flat side and a curved back and narrow enough to require the selected insects to walk through it.

7. An insect trap according to claim 3, wherein one, or more, of the walls of the inspection cylinder are transparent to allow a camera to be mounted in front of it and capture images of the insects.

8. An insect trap according to claim 7, wherein the transparent wall is arranged to capture dorsal or side images of the insects.

9. An insect trap according to claim 3, wherein part of the inside of the inspection cylinder is coated to discourage the insect from walking on the wrong wall of the channel.

10. An insect trap according to claim 3, wherein part of the inside of the inspection cylinder is shaped or textured to discourage the insect from walking on the wrong wall of a channel.

11. An insect trap according to claim 3, wherein once the detector detects an insect, images of the insect are captured and recorded along with the date and time.

12. An insect trap according to claim 11, wherein insects within the inspection cylinder are detected using an infrared detector.

13. An insect trap according to claim 11, wherein insects within the inspection cylinder are detected by searching for motion in the video.

14. An insect trap according to claim 3, wherein the camera system transfers the images of the insects to a base station.

15. An insect trap according to claim 11, wherein the images of the insects are subject to automated classification.

16. An insect trap according to claim 3, wherein the camera system includes a video camera.

17. An insect trap according to claim 3, wherein the sectional dimensions of the inspection cylinder are adjustable.

18. An insect trap according to claim 17, wherein the sectional dimensions of the inspection cylinder are adjusted in such a way that the selected insects cannot fly, only walk.

* * * * *